(12) United States Patent
Gahm et al.

(10) Patent No.: US 9,306,994 B2
(45) Date of Patent: Apr. 5, 2016

(54) STABILIZATION OF ADAPTIVE STREAMING VIDEO CLIENTS THROUGH RATE LIMITING

(75) Inventors: Joshua B. Gahm, Newtonville, MA (US); Saamer Akhshabi, Atlanta, GA (US); Ali C. Begen, London (CA); David R. Oran, Cambridge, MA (US); Biswaranjan Panda, Santa Clara, CA (US); Frederick Baker, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 13/489,786

(22) Filed: Jun. 6, 2012

(65) Prior Publication Data

US 2013/0332620 A1    Dec. 12, 2013

(51) Int. Cl.
| | | |
|---|---|---|
| *G06F 15/16* | (2006.01) | |
| *H04L 29/06* | (2006.01) | |
| *H04N 21/238* | (2011.01) | |
| *H04N 21/61* | (2011.01) | |
| *H04N 21/6332* | (2011.01) | |
| *H04N 21/6338* | (2011.01) | |
| *H04N 21/6373* | (2011.01) | |
| *H04N 21/845* | (2011.01) | |
| *H04L 12/813* | (2013.01) | |

(Continued)

(52) U.S. Cl.
CPC ............ *H04L 65/4084* (2013.01); *H04L 47/20* (2013.01); *H04L 65/60* (2013.01); *H04L 65/80* (2013.01); *H04N 21/23805* (2013.01); *H04N 21/6125* (2013.01); *H04N 21/6332* (2013.01); *H04N 21/6338* (2013.01); *H04N 21/6373* (2013.01); *H04N 21/8456* (2013.01); *H04L 47/193* (2013.01); *H04L 47/215* (2013.01); *H04L 47/22* (2013.01); *H04L 47/32* (2013.01); *H04L 47/38* (2013.01)

(58) Field of Classification Search
CPC ................... H04N 21/23805; H04N 21/6332; H04N 21/6338; H04N 21/6373; H04N 21/8456; H04N 21/6125; H04L 65/4084; H04L 65/60; H04L 65/80; H04L 47/20; H04L 47/32; H04L 47/22; H04L 47/215; H04L 47/38; H04L 47/193
USPC .......................... 709/217, 219, 231, 232, 233
See application file for complete search history.

(56) References Cited

U.S. PATENT DOCUMENTS 8,161,158 B2 *  4/2012  Curcio et al. ................... 709/226
8,396,983 B1 *  3/2013  Inskip et al. ................... 709/233

(Continued)

OTHER PUBLICATIONS

Chenghao Liu et al:"Rate adaptation for dynamic adaptive streaming over HTTP in content distribution network",Signal Processing:Image Communication, Apr. 1, 2012 ISSN:0923-5965.

(Continued)

*Primary Examiner* — Cheikh Ndiaye
(74) *Attorney, Agent, or Firm* — Cindy Kaplan (57) ABSTRACT

In one embodiment, a method includes identifying a current encoding rate requested by a client device for content received from a content source, setting at a network device a rate limit to limit the rate at which the content is received at the client device based on the current encoding rate, and adjusting the rate limit based on changes in the current encoding rate. The rate limit is set to allow the client device to change the current encoding rate to a next higher available encoding rate.

20 Claims, 6 Drawing Sheets

(51) Int. Cl.
*H04L 12/815* (2013.01)
*H04L 12/819* (2013.01)
*H04L 12/811* (2013.01)
*H04L 12/801* (2013.01)
*H04L 12/823* (2013.01)

(56) References Cited

U.S. PATENT DOCUMENTS

| | | | |
|---|---|---|---|
| 8,537,699 B2* | 9/2013 | Leung | 370/252 |
| 2002/0044528 A1* | 4/2002 | Pogrebinsky et al. | 370/230 |
| 2005/0232148 A1* | 10/2005 | Curcio et al. | 370/230 |
| 2008/0192839 A1 | 8/2008 | Gahm et al. | |
| 2008/0310316 A1 | 12/2008 | Oran et al. | |
| 2009/0190474 A1 | 7/2009 | Gahm et al. | |
| 2010/0198979 A1 | 8/2010 | Pickens et al. | |
| 2010/0254462 A1 | 10/2010 | Friedrich et al. | |
| 2010/0299552 A1* | 11/2010 | Schlack et al. | 714/4 |
| 2011/0066673 A1 | 3/2011 | Outlaw | |
| 2013/0138828 A1* | 5/2013 | Strasman et al. | 709/231 |

OTHER PUBLICATIONS

Saamer Akhshabi et al:"An experimental evaluation of rate-adaptive video players over HTTP",Signal Processing:Image Communication, Apr. 1, 2012, ISSN:0923-5965.
Remi Houdaille et al:"Shaping HTTP adaptive streams for a better user experience", Feb. 22, 2012, ISBN:978-1-45-031131-1.
Saamer Akhshabi et al:"What happens when HTTP adaptive streaming players compete for bandwidth?", May 2, 2012, ISBN:978-1-45-031430-5.

* cited by examiner

STABILIZATION OF ADAPTIVE STREAMING VIDEO CLIENTS THROUGH RATE LIMITING

TECHNICAL FIELD

The present disclosure relates generally to communication networks, and more particularly, to stabilization of adaptive streaming video clients.

BACKGROUND

When multiple adaptive bitrate (ABR) streaming clients compete with each other for bandwidth at a bottleneck link the clients may be very unstable, with each client adjusting its requested (and displayed) video rate quite frequently, even when the total bandwidth available to the population as a whole does not change. These frequent shifts in requested/displayed video rate result in a significant degradation in average viewer quality of experience (QoE) for two reasons: (1) the quality level changes are distracting; and (2) the overall quality of experience is biased toward the lowest video rates displayed, since perceptual video quality is, all else being equal, generally a convex function on encoded bitrate.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises identifying a current encoding rate requested by a client device for content received from a content source, setting at a network device a rate limit to limit the rate at which the content is received at the client device based on the current encoding rate, and adjusting the rate limit based on changes in the current encoding rate. The rate limit is set high enough to allow the client device to change the current encoding rate to a next higher available encoding rate.

In another embodiment, an apparatus generally comprises a processor for identifying a current encoding rate requested by a client device for content received from a content source, setting a rate limit to limit the rate at which the content is received at the client device based on the current encoding rate, and adjusting the rate limit based on changes in the current encoding rate. The rate limit is set to allow the client device to change the current encoding rate to a next higher available encoding rate. The apparatus further comprises memory for storing available encoding rates.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In adaptive streaming (also referred to as adaptive bitrate (ABR) streaming or dynamic streaming) a source video is encoded such that the same content is available for streaming at a number of different rates. The content stream is generally structured as an array of content chunks (e.g., pieces of content, fragments, segments, or other suitable sub-divisions of an entire instance of content), typically two to ten seconds in duration. An ABR video client can access chunks stored on servers using a Web paradigm (e.g., HTTP (Hypertext Transfer Protocol) operating over a TCP (Transmission Control Protocol)/IP (Internet Protocol) transport) and make a decision about which specific representation (e.g., video encoding rate) of any given content it will request from the server. The decision may be based on various parameters or observations, including, for example, current bandwidth (e.g., based on monitored delivery rate) and/or fill level of the client buffer. Throughout the duration of a given viewing experience, the ABR video client may upshift to a higher encoding rate to obtain better quality when available bandwidth increases, or downshift to a lower encoding rate when available bandwidth decreases.

Adaptive bitrate video clients typically operate in unfettered greedy mode and are not necessarily designed to behave well in environments where other ABR video clients are competing for the same pool of bandwidth. Therefore, when multiple adaptive streaming clients compete with each other for bandwidth, the clients may exhibit instabilities, with each client adjusting its requested video rate frequently, even when the total bandwidth available to the population as a whole does not change. The following describes how instability arises in populations of competing adaptive bitrate video clients in conventional systems. This foundational information is provided as a basis from which the present disclosure may be properly explained.

When adaptive streaming video clients compete with each other for bandwidth, each client in the population independently attempts to learn how much bandwidth it can use for downloading content, and then requests the content encoded at a higher or lower bitrate depending on whether its estimate of the available bandwidth is higher or lower than the encoding rate previously requested. Although there are many different types of adaptive bitrate clients currently in use in conventional systems, most ABR video clients share some basic characteristics in terms of how they estimate the available network bandwidth, and also to some extent how they adapt their requests in response to changes in the estimated available bandwidth. For example, most ABR clients estimate the available network bandwidth by measuring the time it takes to download a chunk of content over one or more HTTP/TCP connections and then form a time-weighted moving average of recent download rates over a range of recently downloaded chunks. If this time-weighted moving average of available bandwidth exceeds the next higher available video rate by a sufficient margin, the client may upshift and begin to request video at the next higher available rate in subsequent fetches. Conversely, if the time-weighted moving average of recent download rates is lower than the encoding rate of the content currently being requested, the client may downshift and begin to request video at a lower available encoding rate in subsequent fetches.

When a client upshifts, the encoded video chunks that it requests are typically larger than the chunks it would have requested before the upshift, since each chunk is encoded at a higher bitrate. Therefore, an upshift causes a client to consume more bandwidth on the network than it was using prior to the upshift. Similarly, each time a client downshifts it consumes less bandwidth on the network. In cases where multiple adaptive bitrate video clients compete with each other for bandwidth at a bottleneck link, a single client upshift may cause other clients to downshift and vice versa. Depending on the averaging time scales and the details of the adaptation algorithms used by the competing clients, the overall system may exhibit various forms of instability due to complex patterns of feedback among the adaptation control loops, each operating independently on a separate client. Such system instabilities may result in relatively frequent shifts in selected video rate for each client, with a resultant loss in overall quality of experience (QoE) for most clients. Details of a mechanism of instability at adaptive bitrate video clients in a conventional adaptive streaming system are described below.

Adaptive bitrate video clients typically fetch chunks of content from a server via HTTP/TCP, with each chunk representing an approximately equal temporal duration of the content. During each of these fetches, a content source (e.g., server) transfers the requested chunk as fast as possible within the constraints of the standardized TCP congestion control and flow control algorithms, and the client receives the chunk (by draining its socket buffer) as fast as possible. The limiting factor in the overall speed of the transfer is, therefore, the congestion state of the network between the server and client and the dynamics of the TCP connection.

At the start of play of new content (e.g., after a search to a new position in content or when recovering from a network congestion event), a client typically fetches several chunks in quick succession in order to build up its local buffer. These transfer requests keep the TCP connection(s) used to perform the transfers running at nearly the maximum allowable rate from server to client until the back to back transfers have been completed. Once the client has filled its buffer to a sufficient level (i.e., steady state), it will typically switch to a mode wherein the client requests transfers only frequently enough to keep its buffer full. For example, if each chunk of the content represents two seconds worth of content and the network is able to transfer these two seconds worth of content in only one second, the client will typically request a new fragment only every two seconds, with the requested fragment being transferred during the first one second of this two second period and the TCP connection remaining idle during the remainder of the period. Thus, once the client has filled its buffer sufficiently, it will typically generate a 'square-wave' traffic profile on each of its TCP connections, with a repeating pattern of chunks sent from server to client at the maximum sustainable rate, followed by an idle period, followed by another transfer at maximum rate, and so on.

This characteristic square-wave pattern of transfers can lead to instability when multiple ABR video clients compete with each other for bandwidth. The problem arises because: (1) each client can only estimate the available bandwidth during the periods when it is transferring something on its TCP connection(s); and (2) each client only effectively provides information to other clients about its own bandwidth utilization during the periods when it is actually transferring something. This instability is further explained below with reference to examples.

In a first example, two clients (client A, client B) share a 10 Mbps bottleneck link. Client A requests a 10 Mbps chunk every two seconds and client B requests a 10 Mbps chunk every two seconds. If clients A and B begin their transfers at exactly the same time, at the start of each two second interval, the transfers are fully overlapping. In this case, TCP congestion control mechanisms ensure that each client receives an approximately fair-share of the available bandwidth during the transfer. Each transfer therefore runs at approximately 5 Mbps and is completed in approximately two seconds. In this example, each client will (correctly) estimate that the average bandwidth available to it is 5 Mbps.

In a second example, the two clients (A and B) again share a 10 Mbps bottleneck link and each requests a 10 Mbps chunk every two seconds. In this example, A begins to fetch data at time zero within the two second interval and client B begins to fetch data at one second into the two second interval. In this case, client A's fetch runs at the full 10 Mbps rate and is completed in one second, just in time for client B's fetch to begin. Client B completes its fetch at 10 Mbps as well, just in time for client A to begin its next fetch at the start of the next two second interval. In this example each client will (incorrectly) estimate its average available share of bandwidth to be 10 Mbps. The clients may therefore attempt an upshift.

As soon as either client upshifts, the content transfers for clients A and B will begin to overlap, since the upshifting client will begin to fetch chunks larger than 10 Mbit, which cannot be done at 10 Mbps in the one second available before the next client begins to fetch data. Therefore, as soon as either client upshifts, both clients will begin to get lower estimates of available bandwidth, which will be much closer to the correct value of 5 Mbps. This will force the upshifting client to downshift again. This example illustrates how, depending on the phase alignment of fetches between the two clients, even just two adaptive bitrate clients competing for bandwidth may create an unstable situation, with either or both clients repeatedly upshifting and downshifting.

In a third example, the two clients (A and B) again share a 10 Mbps bottleneck link and each requests a 10 Mbps chunk every two seconds. In this example, client B's fetch is shifted to begin either slightly earlier or later than one second into the two second interval. In either case, the fetches of the two clients will begin to overlap. During the period when the two fetches overlap each will run at approximately 5 Mbps rather than 10 Mbps. However, since each fetch runs slower during the overlap, the overall fetch time needs to be increased, which leads to more overlap.

As can be observed from the above examples, the only pattern that allows both clients to complete their fetches and also fair-share bandwidth during the overlap period is for the fetches to be fully overlapped, with each running for the full two second period at 5 Mbps.

As an alternative to moving client B's fetches to begin a bit earlier or later than one second, each client's fetches may be rate limited on a per-connection basis. For example, the fetches may be rate limited to 9 Mbps. This will force each client's transfers to stretch out a bit beyond one second to the point where the transfers overlap and the only solution that allows for fair-share during the overlap is for both clients to run at 5 Mbps during the entire two second interval. Thus, by rate-limiting each connection, the two clients are forced away from an unstable equilibrium in which they repeatedly upshift and downshift, and toward a stable equilibrium where each client correctly measures its available bandwidth at all times. As described further below, experiments have exhibited that something similar to the behavior in the above examples is in fact a source of instability with populations of actual clients.

A particular mechanism of interaction among the client adaptation control loops that leads to instability has been described above, and a remedy for this instability is provided by embodiments described herein. The embodiments provide a way to stabilize the requested/displayed video rates for competing adaptive bitrate video clients without the need for a centralized entity assigning specific encoding rates to each client. The overall or average quality of experience measured across all of the clients is generally improved if each client remains set at a specific bitrate, preferably close to its fair-share portion of the available link bandwidth, rather than fluctuating widely around the fair-share bandwidth. As described in detail below, the embodiments provide a technique for dynamically limiting the throughput of the connections used by adaptive bitrate clients in a way that greatly enhances the stability of each client without requiring any centralized management of the rate selection for each client. Since there is no need to centrally manage the bandwidth available to each client, client rate selection remains distributed. The embodiments may be applied across a wide variety of different adaptive bitrate technologies and some embodiments may be implemented without modification to existing client devices.

Figure 1:
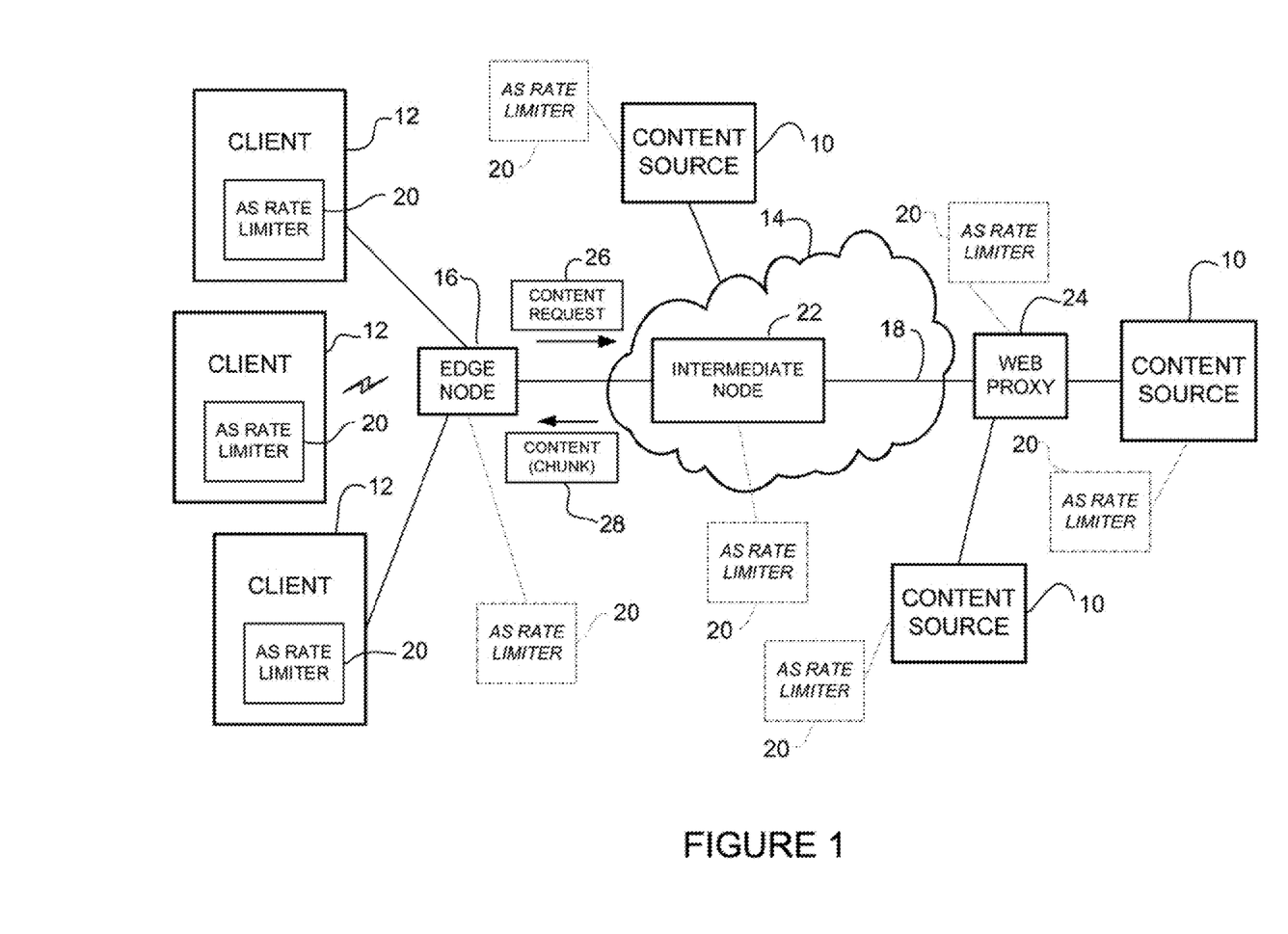
FIG. 1 illustrates an example of a network in which embodiments described herein may be implemented.

Referring now to the drawings, and first to FIG. 1, an example of a network in which embodiments described herein may be implemented is shown. A communication system includes a plurality of content sources (servers) 10 in communication with a plurality of content receivers (clients, client devices, end users, endpoints) 12 over network 14. The content sources 10 are configured to deliver requested content to content receivers 12. The content may include any suitable information that can propagate in the network 14. For example, content may include video, images, graphics, text, Web pages, audio, or other data or combination thereof. The content transmitted from the content source 10 may be encrypted, compressed, or encoded according to any format. There may be any number of content sources 10 providing content to any number of clients 12. For simplification, only a small number of nodes are shown in the communication system.

In one embodiment, the communication system includes an adaptive streaming video system that makes use of multi-rate video encoding and an IP transport protocol suite (e.g., HTTP/TCP/IP or other equivalent protocols as noted below) to deliver high quality streaming video to a plurality of simultaneous users under varying network conditions. As previously described, with adaptive streaming the source video is encoded such that the same content is available for streaming at a number of different rates. The adaptive bitrate client devices 12 are operable to transmit content requests 26 to request chunks of content encoded at different bitrates to content source 10 (or another network device in communication with the content source). In response to the request 26, the content source 10 transmits encoded content (chunk) 28 to the client 12. Based on various properties of the content and observations such as available bandwidth and amount of data in the client buffer, the client 12 may upshift or downshift (i.e., switch to a different bitrate) or stay at the same bitrate to provide continuous playout.

The content receivers 12 may be associated with devices, customers, or end users that want to receive content in the communication system. The content receivers 12 may be any network device operable to request and receive content from content source 10. The client devices 12 may be wired or wireless and may include, for example, cellular phones, smart phones, personal digital assistants (PDAs), tablets, multimedia devices, laptops, personal computers, set-top terminals (boxes), televisions with communication capabilities, or any other device operable to initiate and/or respond to video, audio, media, or data exchanges within the communication system. The content receiver 12 may also be a device that seeks to engage in communications on behalf of another entity or element, such as a program, database, or other component.

In the example shown in FIG. 1, the client devices 12 are in communication with a network device 16 (e.g., edge node, cache node, gateway, router, switch). The edge node 16 is in communication with the content source 10 (or content sources) over a communication (data) path 18. The bandwidth may be restricted at a location on the path, which is considered a 'bottleneck link'. For example, the bandwidth available on one or more links within the communication path may limit the rate at which data is transferred from the content source 10 to the clients 12. The data path 18 between the content source 10 and clients 12 traverses network 14 and may include any number or type of intermediate nodes 22 (e.g., routers, switches, gateways, cache nodes, or other network devices), which facilitate passage of data between the endpoints. The network 14 may include one or more networks (e.g., local area network, metropolitan area network, wide area network, enterprise network, Internet, intranet, radio access network, public switched network, or any other network or combination of networks).

The content source 10 may be, for example, a server (e.g., origin server) or group of servers that stores content locally or obtains the content from another server or media source via another network, satellite, cable, or any other communication device or system. The content source 10 may store or cache content that was encoded and segmented at another device. The content source sends encoded streams in the form of chunks encoded at different bitrates to the client device 12. The content source 10 may be located in a content delivery network operable to acquire and stream media. The content delivery network may include streaming applications for content delivery to digital televisions and set-top boxes, and Internet streaming applications for content delivery to IP devices such as personal computers, mobile phones, and handheld devices, for example.

The communication system includes one or more rate limiters 20 (referred to herein as an adaptive streaming (AS) rate limiter since it is used in the context of an adaptive streaming system). The AS rate limiter 20 is operable to provide rate limiting (e.g., per TCP connection) with the limiting rate dynamically determined with reference to the available rates for the adaptive bitrate content being requested and the current rate being requested by the adaptive bitrate video client 12. The rate limiter 20 may be located at the adaptive bitrate client devices 12 (as shown in FIG. 1) or at the content sources 10 or other network device (as indicated by the rate limiters shown in phantom in various locations within the communication system in FIG. 1). For example, the rate limiter 20 may operate at a network device (edge node 16, intermediate node 22) interposed between the clients 12 and sources 10 in the network path. In another example, the rate limiter 20 is applied within one or more of the content sources (server systems) 10. The rate limiter 20 may also be implemented at a Web proxy 24 or any combination of these or other locations. As described below, if the rate limiter 20 is implemented at a location other than the client device 12, client rate selection still remains distributed at the client devices. Details of operation of the rate limiter 20 are described further below.

It is to be understood that the network shown in FIG. 1 and described herein is only an example and that the embodiments may be implemented in networks having different network topologies or network devices, without departing from the scope of the embodiments. For example, the embodiments are described herein in the context of a computer network environment, with content embodied as video. It should be understood that other content (e.g., audio, data, graphics, images, etc.) in lieu of or in addition to video, is also considered within the scope of the embodiments. Furthermore, certain embodiments of adaptive streaming systems are described herein in the context of adaptive streaming in an environment that uses HTTP/TCP/IP. It is to be understood that other networks distributing multimedia (e.g., video, graphics, audio, or data) may also benefit from certain embodiments of adaptive streaming systems and methods and are contemplated to be within the scope of the embodiments. For example, other application protocols such as HTTPS (Hypertext Transfer Protocol Secure) or SPDY (SPeeDY) may be used instead of HTTP, or other transports such as SCTP (Stream Control Transmission Protocol), DCCP (Datagram Congestion Control Protocol), or MPTCP (Multipath TCP) may be used instead of TCP. Also, the use of per connection rate limiting to make transfers more closely fair-share a connection may be applied to systems other than adaptive bitrate streaming systems.

Figure 2:
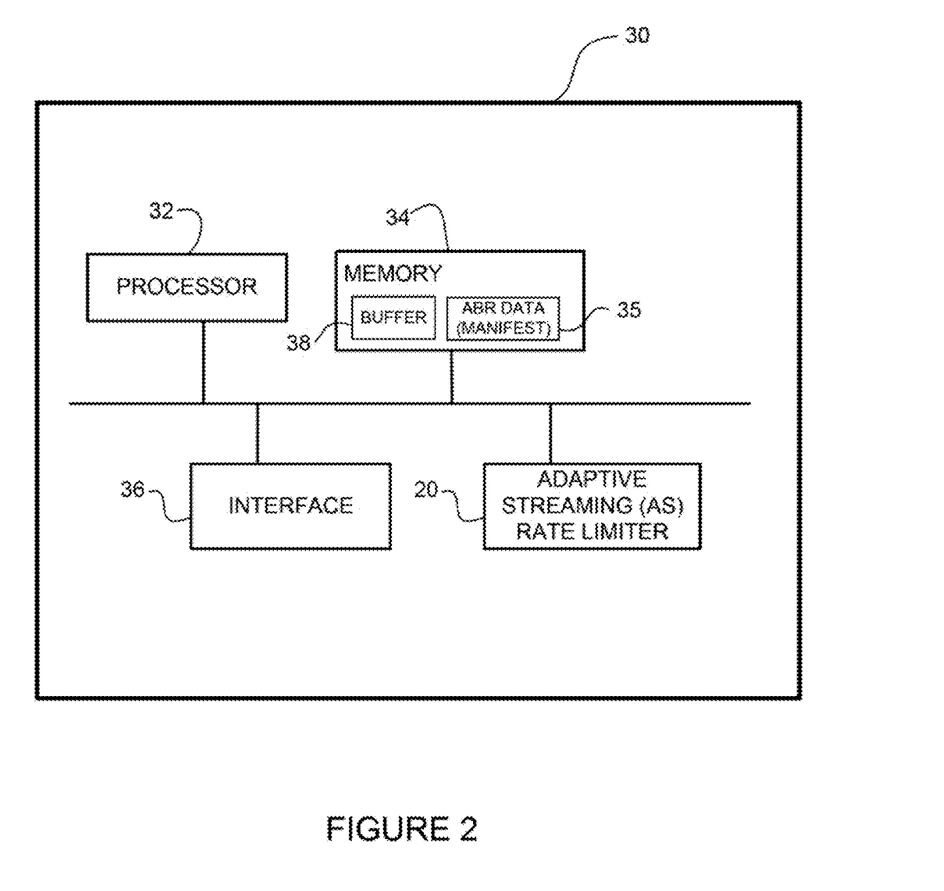
FIG. 2 depicts an example of a network device useful in implementing embodiments described herein.

FIG. 2 illustrates an example of a network device 30 (e.g., source 10, client 12, edge node 16, intermediate node 22, Web proxy 24) that may be used to implement embodiments described herein. In one embodiment, the network device 30 is a programmable machine that may be implemented in hardware, software, or any combination thereof. The network device 30 includes one or more processor 32, memory 34, network interface 36, and rate limiter 20.

Memory 34 may be a volatile memory or non-volatile storage, which stores various applications, operating systems, modules, and data for execution and use by the processor 32. Memory 34 may comprise one or more buffers 38 for temporarily storing compressed or reconstructed video or other network data. For example, at client device 12 the buffer 38 is configured to buffer received content and provide a status of the buffer (e.g., via a buffer monitor module) to bitrate selection logic. Memory 34 also stores ABR information 35 (e.g., available encoding rates), which may be included in a matrix or manifest as described below. Memory 34 may also store computer code for the rate limiter 20. Memory 34 may comprise separate memory elements (e.g., media memory, system memory, etc.).

Adaptive streaming systems typically use a two-dimensional matrix, with one dimension consisting of time and the other dimension consisting of target encoding rate. The structure of the content matrix, along with associated metadata describing each chunk, is contained in a structure, generally referred to as a manifest. The manifests are typically divided into representations each of which describes one row of the content matrix (e.g., all chunks encoded at a bitrate). There exist various schemes for the manifests. Metadata may include, for example, location or identification of each chunk, chunk size, quality level, bitrate, timestamp information, etc. It is to be understood that the manifest described herein is only one example of a data structure that may be used to provide available encoding rates.

Referring again to FIG. 2, logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 36 may comprise any number of interfaces (linecards, ports) for receiving data or transmitting data to other devices. The interface 36 may include, for example, an Ethernet interface for connection to a computer or network or a wireless interface for communication with an access point or base station. In one example, the network interface 36 is configured for enabling communication (e.g., TCP/IP) with other network devices and for receiving the manifest 35 (or information therein) as well as the requested chunks.

The adaptive streaming rate limiter 20 is configured to select and apply the rate limit for each connection such that the client 12 is permitted to upshift while at the same time maintaining the rates low enough to maximize overlapping of the transfers among competing clients. Examples of adaptive streaming rate limiters 20 are described below with respect to FIG. 3.

It is to be understood that the network device 30 shown in FIG. 2 and described above is only an example and that different configurations of network devices may be used. The network device 30 may further include any suitable combination of hardware, software, algorithms, processors, devices, components, or elements operable to facilitate the capabilities described herein. For example, a network device configured for use as a client device 12 may further comprise a decoder for decoding (e.g., decompressing and reconstructing) the chunks and a rate selection module operable to select an encoding rate and determine the need for downshifting or upshifting to a different bitrate based on available bandwidth and other factors.

The rate limits for each connection are set just high enough to permit the client 12 to upshift to the next higher available encoding rate if there is sufficient bandwidth to support a higher encoding rate, while at the same time keeping the rates low enough to maximize overlapping of transfers among competing clients and minimize oscillations and frequent rate changes due to mis-estimation of available bandwidth. The rate limits are dynamically set and readjusted each time an upshift or downshift occurs so that the fetches will be capped at a rate no higher than necessary to allow an upshift. Maintaining the rate limit at the lowest level consistent with allowing for an upshift ensures that transfers overlap each other as much as possible, thus allowing each client to more accurately estimate its fair-share bandwidth.

In order for the client 12 to be able to upshift, it normally has to detect a time-averaged download rate that is at least as high as the next higher encoding rate available for the content, and often an additional fraction beyond that rate to ensure that the upshift will be sustainable. Thus, the rate limit may be set based on the current encoding rate, the next higher available encoding rate (which may be obtained from a manifest or calculated algorithmically, such as via a multiple of the current encoding rate), and a margin above the next rate needed for the client to upshift. It is to be understood that the term 'encoding rate' as used herein may refer to a video rate, average bitrate, advertised bitrate, or any other type of rate or representation associated with content that may be requested by the client 12 or available for request by the client.

Figure 3:
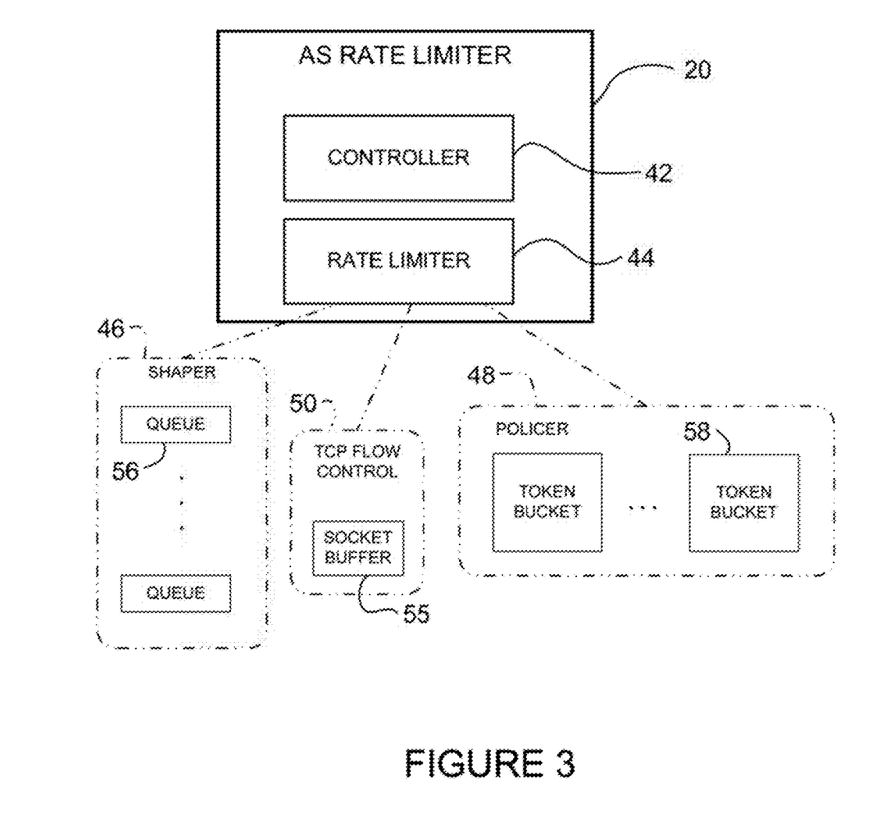
FIG. 3 is a block diagram illustrating an example of an adaptive streaming rate limiter.

FIG. 3 is a block diagram of the adaptive streaming rate limiter 20 used to set and apply the rate limit, in accordance with one embodiment. In the example shown in FIG. 3, the adaptive streaming rate limiter 20 includes a controller 42 for setting the rate limit and a rate limiter 44 for applying the rate limit. The controller 42 may set the rate limit based on the current encoding rate (e.g., multiple of current encoding rate) or based on the current encoding rate and a list of available encoding rates (e.g., provided in the manifest 35 for the content). The controller 42 may use additional information from the client 12 or manifest 35 in setting the rate limit to an appropriate value. For example, the controller 42 may further take into account the client's knowledge of its CPU or screen capacity or the margin required to remain at the next higher rate. If the rate limiter 20 is located at a network device other than the client 12, then additional steps may be needed to obtain the current encoding rate and manifest, as described below. The controller 42 is also operable to detect changes in the current encoding rate due to an upshift or downshift at the client 12.

Various techniques may be used to provide per-connection rate limiting for flows. Examples of different rate limiting techniques that may be used by the rate limiter 44 are illustrated in FIG. 3. The rate limiter 44 may comprise, for example, a shaper 46, policer 48, or other TCP flow control 50. Each of these rate limiting techniques may be used alone or in combination with one or more other rate limiting techniques. The components illustrated in FIG. 3 may be implemented in suitable algorithms, software, hardware, modules or objects that facilitate the operations thereof. One or more of the elements can have an internal structure or be associated with a structure (e.g., processor, memory element, as described with respect to FIG. 2) to facilitate the operations described herein.

In one embodiment shaping or token-bucket policing is used to rate limit each connection. A separate queue 56 may be assigned to each TCP flow for use in shaping or a separate token bucket 58 may be assigned to each TCP flow for use in policing. The shaper 46 delays excess traffic using a queuing mechanism to hold packets and shape the flow when the data rate is above the rate limit. The policer 48 drops or remarks traffic when the rate limit is exceeded. Shaping, policing, or a combination thereof may be performed in the network (e.g., edge node 16, intermediate node 22, Web proxy 24), on the sender (e.g., source 10), or on the receiving client 12, as described below.

In another embodiment, the TCP's own flow control 50 is used to limit the rate of the TCP connection. The TCP receiver drains its socket buffer 55 no faster than the desired maximum rate of the connection. The TCP socket 55 is preferably drained relatively smoothly (without bursts) but no faster on average than the rate limit applied.

As discussed above with respect to FIG. 1, the rate limiting may be applied at each of the client devices 12, or the content source 10, edge node 16, intermediate node 22, Web proxy 24, or other node in the network, or any combination thereof.

Rate limiting at the client device 12 is preferably implemented through TCP flow control by limiting the rate at which the client drains the TCP socket 55, as described above. Rate limiting at the client 12 may also be implemented through input policing or shaping of the connection or by other methods to limit the rate at which content is received at the client device.

When rate limiting is implemented on the client 12, the rate limit value for each TCP connection may be determined by the client, since the client is generally in the best position to determine the minimum rate limit that would allow for an upshift. The client 12 is typically aware of all video rates available for the content (information provided in the ABR client manifest 35 for the content) as well as the extra margin above the next higher rate in the manifest that would be needed for an upshift.

When rate limiting is implemented in the server (content source 10), the rate limit may be applied by the sending application by feeding the requested content to the sender TCP socket smoothly, but no faster than the rate limit. Alternatively, the rate limit may be implemented in the server 10 by shaping or policing of the connection. The value for the rate limit may be determined with reference to the ABR (client or server) manifest file for the requested content. In one example, the appropriate sending limit (rate limit) can be calculated as follows:

$$(1+e)*R[n+1]$$

where:
R[n] is the video rate requested in the content request (e.g., HTTP request) from client;
R[n+1] is the next higher rate beyond the requested rate, as learned from the manifest file; and
e is a configured constant, which provides a margin above the next higher rate in the manifest to make sure that upshifts are sustainable.

It should be noted that the above equation applies for n<maximum rate in the manifest file. If the client is already at the highest rate in the manifest, then the limit can be calculated as $(1+e)*R[max]$, where R[max] is the maximum rate in the manifest file.

The per connection rate limiting may also be applied within a network element (e.g., network device 12, 22 in FIG. 1) in the path from server 10 to client 12, by shaping or policing the TCP connection. In this case, the rate limit for a connection can be determined in the network element using various techniques. In one example, the network element obtains the URI (Uniform Resource Identifier) of the requested fragment through Deep Packet Inspection (DPI) of the HTTP request 26 (FIG. 1) and then uses this URI to determine (via algorithm and configured information) the URI of the corresponding ABR manifest 35. The network element can then obtain and cache the manifest 35 and use it to set the appropriate rate limit for the connection in the same manner as described above with respect to the server 10.

In another example, the network element learns the encoding rate of the requested content though DPI and parsing of the URI in the request 26 received from the client 10. The rate limit is then set as a fixed, configured multiple of the requested rate (e.g., 2×, 1.5×, etc.). In this case, the rate limit is set high enough to allow an upshift even between the two most widely separated rates across all of the contents offered.

In yet another example, rate limiting is applied by a Web proxy 24. The proxy operates between the client 12 and server 10 to communicate with the server for requested information or has the content already cached for access by the client. The content flows through the Web proxy 24, which acts as a server to the client and a client to the server. In this case, the Web proxy 24 would have the information normally available to the server 10, including the URIs from the content request 26 and the manifest file 35 for the content and can apply the rate limit through any of the same techniques available to the server 10 or client 12.

It is to be understood that the mechanisms and locations used to apply AS rate limiting as described above are only examples and that the rate limiting may be applied using different techniques or at different locations within the network, without departing from the scope of the embodiments. For example, in cases where some clients 12 in a managed network have been modified to support AS rate limiting while others have not, the AS rate limits may be enforced within the clients that support this feature and within the server or network for clients that do not support this feature.

Figure 4:
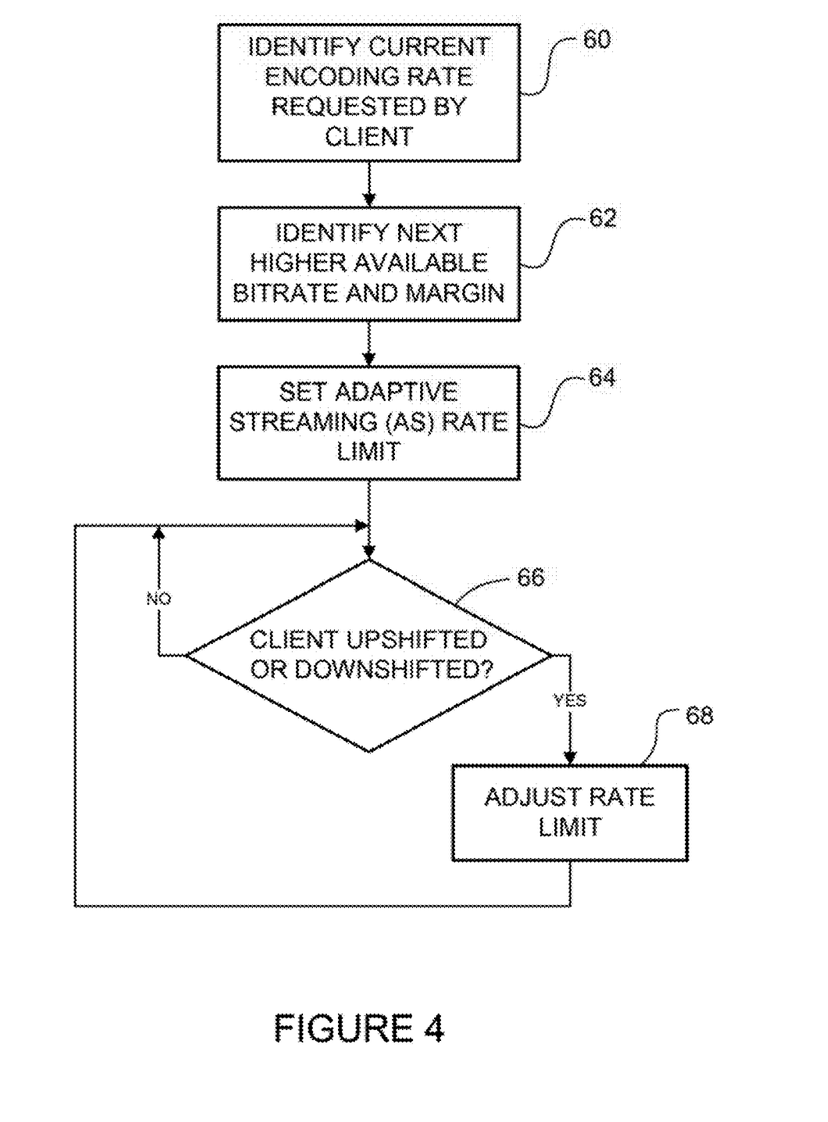
FIG. 4 is a flowchart illustrating a process for stabilization of adaptive streaming clients, in accordance with one embodiment.

FIG. 4 is a flowchart illustrating a process for stabilization of adaptive streaming clients through rate limiting, in accordance with one embodiment. At step 60, a current encoding rate requested by a client device 12 for content received from a content source 10 is identified. If there are multiple connections at the client 12, this is performed for each connection. The next higher available encoding rate for the content is also identified (step 62). As described above, this may be defined in a manifest or as a multiple of the requested rate. The network device may also identify a margin above the next higher rate at which the client will be permitted to upshift. Based on the available rates for the ABR content being requested and the current rate requested by the client 12, a rate limit is set (step 64). The rate limit is set to allow the client 12 to change the current encoding rate to a next higher available encoding rate if there is available bandwidth. The rate limit may be set and applied at the content source 10, client 12, or other network device (e.g., nodes 16, 22, or 24 in FIG. 1). If the client upshifts or downshifts, the rate limit is dynamically adjusted to allow the client to upshift to the new next higher encoding rate (steps 66 and 68). Steps 60-64 may be repeated to determine the new rate limit following an upshift or downshift at the client device. As described above, the rate limit is preferably set at the lowest level consistent with allowing for an upshift at the client 12. This permits the ABR client 12 to upshift while at the same time keeping the rates low enough to maximize overlapping of transfers among competing clients.

It is to be understood that the process shown in FIG. 4 and described above is only an example and that steps may be added, removed, reordered, combined, or modified, without departing from the scope of the embodiments.

The following provides an example of the process illustrated in FIG. 4. In this example, an ABR client 12 is playing content with the currently selected encoding rate for the content at 1 Mbps, the next higher video rate that is available for the content is 1.2 Mbps, and the client requires a 10% margin above the next higher rate in order to upshift. The rate limiter 20 therefore limits the rate for the connection on which the content is fetched to 110%*1.2 Mbps=1.32 Mbps. If the client 12 identifies available bandwidth and upshifts to 1.2 Mbps, the rate limit on the connection is readjusted to 10% above the next higher rate available for the content. If 1.2 Mbps is the top rate available for the content, then the client can keep its rate limit set to 1.32 Mbps even after upshift since learning that there is more bandwidth beyond this level would not permit any further upshift. In addition, if the client is aware of other factors that would prevent it from taking advantage of additional bandwidth (e.g., insufficient CPU power to decode a higher bitrate or insufficient screen resolution to allow for display of the next higher bitrate), then the client should keep its rate limit set to 1.32 Mbps after the upshift.

Figure 5:
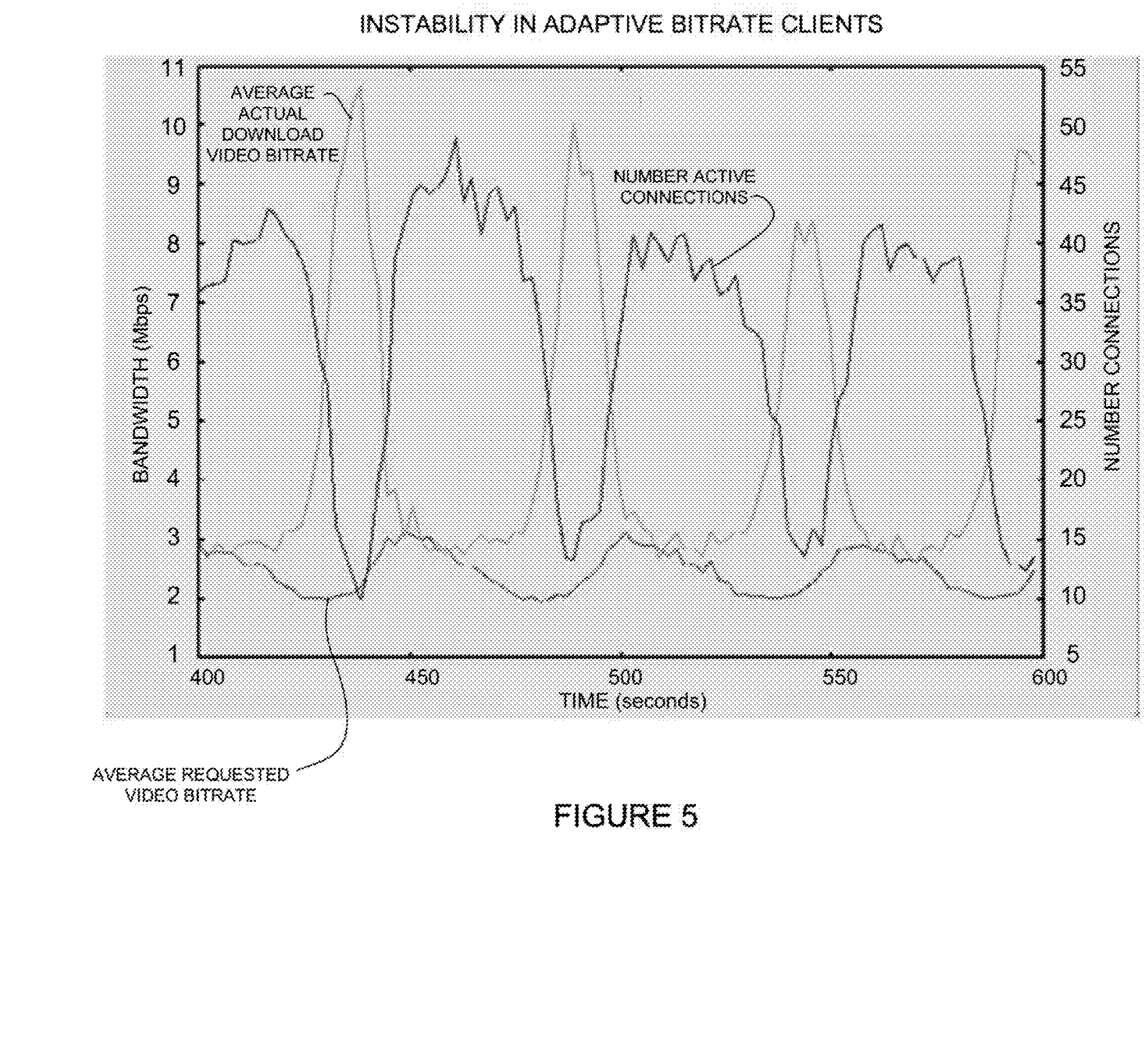
FIG. 5 is a graph illustrating how instability occurs in adaptive bitrate clients operating without rate limiting.
Figure 6:
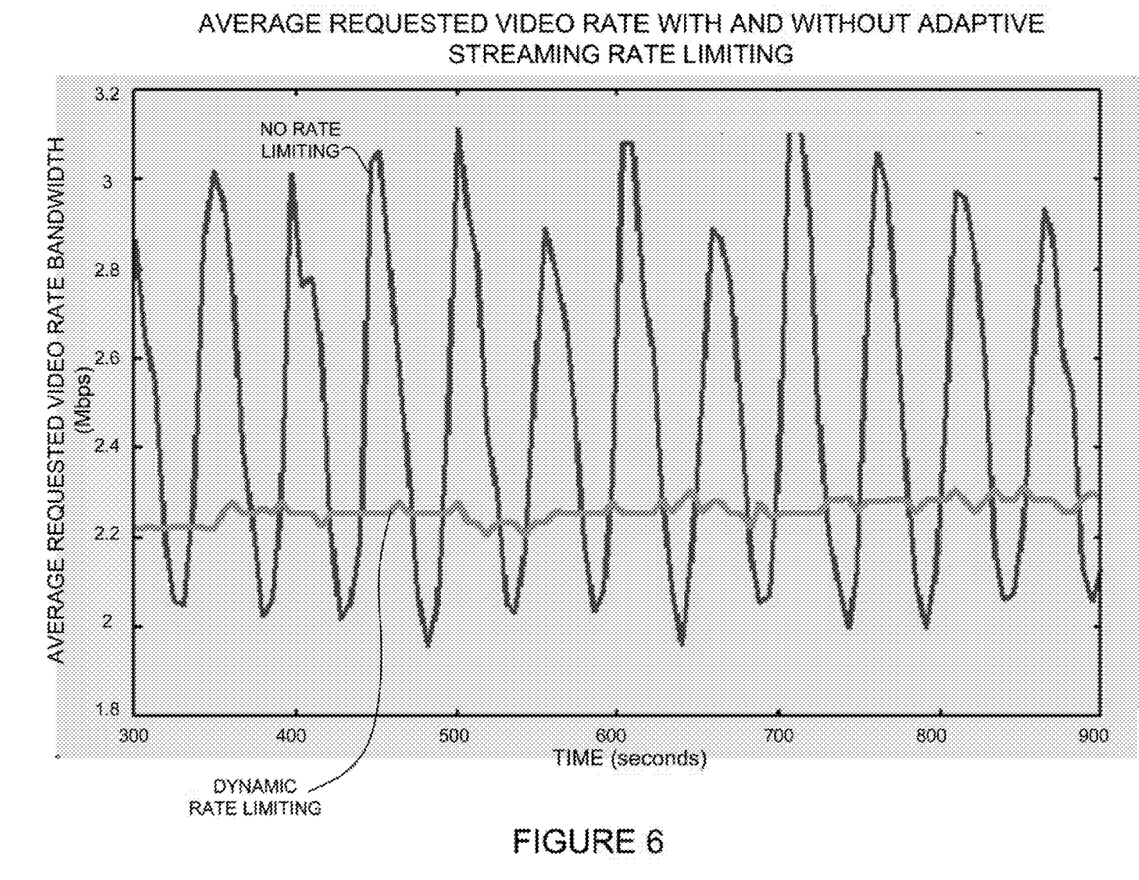
FIG. 6 is a graph showing a comparison of average requested video rate in a system operating with adaptive streaming rate limiting and a system operating without the rate limiting.

The following examples illustrate the principles and advantages of the embodiments. FIG. 5 illustrates instability in a group of competing adaptive bitrate clients in a conventional system. FIG. 6 illustrates the stabilization provided by the rate limiting embodiments as exhibited by an example prototype.

Referring first to FIG. 5, a graph illustrating an experiment in a conventional system in which 36 ABR clients were configured to play content with all clients competing for bandwidth on a 100 Mbps bottleneck link is shown. The content was encoded with a variety of different video bitrates ranging from 440 Kbps to 10 Mbps, with each bitrate encoded using constant bitrate encoding. The x-axis shows the time in seconds relative to the start of the experiment. A first line in the graph (labeled "Average Requested Video Bitrate") shows the average video bitrate encoding requested by clients during a small window of time around the indicated x-axis time. The graph indicates that around 425 seconds the average bitrate being requested by all 36 clients was approximately 2 Mbps, whereas around 450 seconds, the average bitrate requested by all 36 clients was approximately 3 Mbps. The average requested bitrate oscillates in a regular pattern with a period of approximately 50-60 seconds.

The line labeled "Average Actual Download Video Bitrate" shows the average actual download rate for chunks fetched during a window of time around the indicated x-axis value. For example, at approximately 440 seconds and at repeating intervals thereafter, there are spikes indicating that fragments were fetched at approximately 10 Mbps, whereas at most of the time chunk download rates were closer to 3 Mbps. Since ABR clients estimate available bandwidth based on a moving average of observed chunk download rates and upshift whenever more bandwidth appears to be available, these spikes in observed download rate explain the corresponding peaks in the requested video rates. A short time after each of the spikes in observed download rate ("Average Actual Download Video Bitrate"), some clients in the population upshift, leading to an increase in the "Average Requested Video Bitrate".

A third plot (labeled "Number Active Connections") is plotted against the right hand y-axis and shows at each point in time the number of TCP connections that were actually being used to fetch a chunk. It is noted that the number of potentially active TCP connections is two times the number of clients since each client in this example uses two TCP connections. As can be seen from the graph, peaks in the "Average Actual Download Video Bitrate" plot, indicating times when fetches completed very quickly, correspond to times where very few fetches were actually in progress at the same time. When clients downshift, their transfers tend not to overlap with each other very much, allowing each client to overestimate the available bandwidth. When a sufficient number of clients upshift, the individual transfers become much more overlapped, thereby allowing each client to form a more accurate estimate of the available bandwidth.

The graph shown in FIG. 6 illustrates an example implementation of the embodiments described herein (with rate limiting) compared to a conventional system (without rate limiting). In the graph shown in FIG. 6, the x-axis is time in seconds and the y-axis is the average requested video rate bandwidth in Mbps. A first plot labeled "No Rate Limiting" shows the results without the use of the rate limiting described herein. A second plot, labeled "Dynamic Rate Limiting" shows the results with the adaptive streaming rate limiting described herein implemented. The "Dynamic Rate Limiting" plot exhibits performance of an embodiment in which packets were intercepted and routed through a system that performs DPI to learn rates of the requested video for each connection and then performs rate limiting by policing each connection (with adequate token bucket size) to a fixed multiple of the requested rate (set to 2.0× in this example). As can be observed from the graph, almost all of the oscillations in the requested video rate have disappeared through the use of rate limiting. An analysis in which the number of rate shifts was counted showed that with the stabilization process (rate limiting) in use, the number of rate shifts experienced by the clients went down by a factor of more than 20.

It is to be understood that the experiment shown in FIG. 6 and described above is only an example of results that may be obtained with one embodiment using one type of rate limiting and components (client devices, measurement equipment, etc.).

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    identifying a current encoding rate requested by a client device for content received from a content source;
    based on said current encoding rate, setting at a network device, a rate limit to limit a rate at which said content is received at the client device, wherein the rate limit is set to allow the client device to change said current encoding rate to a next higher available encoding rate; and
    adjusting the rate limit based on changes in said current encoding rate;
    wherein the rate limit provides rate stabilization for competing clients by permitting the client device to shift to said next higher available encoding rate while maintaining the rate low enough to maximize overlapping of content transfers among the competing clients and minimize frequent rate changes;
    wherein said next higher available encoding rate is a rate that is at least as high as a next higher encoding rate that the client device has to detect to be able to upshift; and
    wherein setting the rate limit comprises calculating a sending limit equal to:

$(1+e)*R[n+1]$;

wherein:
    $R[n+1]$ is said next higher available encoding rate for n<maximum available encoding rate; and
    e is a constant.

2. The method of claim 1 wherein the rate limit is set for each connection at the client device.

3. The method of claim 1 wherein the network device is the client device.

4. The method of claim 3 wherein setting the rate limit comprises limiting the rate at which a client socket is drained.

5. The method of claim 1 wherein the network device is the content source.

6. The method of claim 1 wherein the network device is located in a network path between the client device and the content source.

7. The method of claim 6 further comprising performing deep packet inspection of a request received from the client device to identify said current encoding rate.

8. The method of claim 6 wherein the rate limit is calculated as a multiple of said current encoding rate.

9. The method of claim 1 wherein the network device comprises a Web proxy located between the content source and the client device.

10. The method of claim 1 wherein setting the rate limit comprises identifying said next higher available encoding rate and adding a margin to said next higher available encoding rate.

11. The method of claim 1 further comprising shaping or policing network flow to apply the rate limit.

12. The method of claim 1 wherein the client device and a plurality of other client devices request content over a common network path and the rate limit is set independently for each of the client devices.

13. The method of claim 1 wherein the next higher encoding rate that the client device has to detect to be able to upshift comprises a time-averaged download rate that is at least as at least as high as the next higher encoding rate available for the content and an amount beyond that rate to ensure that the upshift is sustainable.

14. The method of claim 1 wherein $R[n+1]$ is learned from a file and e provides a margin above the next higher rate in the file to ensure that upshifts are sustainable.

15. An apparatus comprising:
    a processor for identifying a current encoding rate requested by a client device for content received from a content source, setting a rate limit to limit a rate at which said content is received at the client device based on said current encoding rate, and adjusting the rate limit based on changes in said current encoding rate; and
    memory for storing available encoding rates;
    wherein the rate limit is set to allow the client device to change said current encoding rate to a next higher available encoding rate;
    wherein the rate limit provides rate stabilization for competing clients by permitting the client device to shift to said next higher available encoding rate while maintaining the rate low enough to maximize overlapping of content transfers among the competing clients and minimize frequent rate changes;
    wherein said next higher available encoding rate is a rate that is at least as high as a next higher encoding rate that the client device has to detect to be able to upshift; and
    wherein the apparatus comprises the content source and setting the rate limit comprises calculating a sending limit equal to:

$(1+e)*R[n+1]$;

wherein:
    $R[n+1]$ is said next higher available encoding rate for n<maximum available encoding rate; and
    e is a constant.

16. The apparatus of claim 15 wherein the apparatus comprises the client device and setting the rate limit comprises limiting the rate at which a client socket is drained.

17. The apparatus of claim 15 wherein the apparatus is configured for operation in a network path between the client device and the content source and the processor is configured for performing deep packet inspection of a request received from the client device to identify said available encoding rates.

18. The apparatus of claim 15 further comprising a rate limiter configured for shaping or policing network flow.

19. The apparatus of claim 15 wherein said available encoding rates are contained within a manifest.

20. Logic encoded on one or more non-transitory computer readable media for execution and when executed operable to:
    identify a current encoding rate requested by a client device for content received from a content source;
    based on said current encoding rate, set a rate limit to limit a rate at which said content is received at the client device, wherein the rate limit is set to allow the client device to change said current encoding rate to a next higher available encoding rate; and
    adjust the rate limit based on changes in said current encoding rate;

wherein the rate limit provides rate stabilization for competing clients by permitting the client device to shift to said next higher available encoding rate while maintaining the rate low enough to maximize overlapping of content transfers among the competing clients and minimize frequent rate changes;

wherein said next higher available encoding rate is a rate that is at least as high as a next higher encoding rate that the client device has to detect to be able to upshift; and wherein setting the rate limit comprises calculating a sending limit equal to:

$(1+e)*R[n+1];$ wherein:
R[n+1] is said next higher available encoding rate for n<maximum available encoding rate; and
e is a constant.

* * * * *